(12) United States Patent
Wang et al.

(10) Patent No.: US 8,203,023 B2
(45) Date of Patent: Jun. 19, 2012

(54) TAILORED FISCHER-TROPSCH SYNTHESIS PRODUCT DISTRIBUTION

(75) Inventors: Yong Wang, Richland, WA (US); Chunshe Cao, Kennewick, WA (US); Xiaohong Shari Li, Richland, WA (US); Douglas C. Elliott, Richland, WA (US)

(73) Assignee: Battelle Memorial Institute, Richland, WA (US)

( * ) Notice: Subject to any disclaimer, the term of this patent is extended or adjusted under 35 U.S.C. 154(b) by 809 days.

(21) Appl. No.: 12/023,939

(22) Filed: Jan. 31, 2008

(65) Prior Publication Data

US 2008/0207969 A1    Aug. 28, 2008

Related U.S. Application Data

(62) Division of application No. 10/911,976, filed on Aug. 4, 2004, now abandoned.

(60) Provisional application No. 60/493,094, filed on Aug. 5, 2003.

(51) Int. Cl.
*C07C 9/22* (2006.01)
*C07C 1/02* (2006.01)

(52) U.S. Cl. ............ 585/14; 518/712; 518/715

(58) Field of Classification Search .......... 518/700, 518/712–715; 585/1, 2, 7, 952, 14–16; 44/307–308; 208/14–17, 950
See application file for complete search history.

(56) References Cited

U.S. PATENT DOCUMENTS

| | | | |
|---|---|---|---|
| 4,555,526 A * | 11/1985 | Wakui et al. ............ 518/717 |
| 4,738,948 A | 4/1988 | Iglesia et al. |
| 4,795,618 A | 1/1989 | Laumen |
| 4,801,620 A | 1/1989 | Fujitani et al. |
| 4,833,170 A | 5/1989 | Agee |
| 5,036,032 A | 7/1991 | Iglesia et al. |
| 5,112,527 A | 5/1992 | Kobylinski |
| 5,366,719 A | 11/1994 | van Wingerden et al. |
| 5,545,674 A | 8/1996 | Behrmann et al. |
| 5,652,193 A | 7/1997 | Herskowitz et al. |
| 5,807,413 A * | 9/1998 | Wittenbrink et al. ........ 44/451 |
| 6,180,842 B1 | 1/2001 | Berlowitz et al. |
| 6,211,255 B1 | 4/2001 | Schanke et al. |
| 6,255,358 B1 | 7/2001 | Singleton et al. |
| 6,262,131 B1 | 7/2001 | Arcuri et al. |
| 6,265,451 B1 | 7/2001 | Zhou et al. |
| 6,451,864 B1 | 9/2002 | Wang et al. |
| 6,491,880 B1 | 12/2002 | Wang et al. |
| 6,558,634 B1 | 5/2003 | Wang et al. |
| 6,616,909 B1 | 9/2003 | Tonkovich et al. |
| 6,660,237 B2 | 12/2003 | Wang et al. |

(Continued)

OTHER PUBLICATIONS

Design, Synthesis and use of cobalt based Fischer Tropsch synthesis catalysts Applied Catalysts A General 161 (1997) pp. 59-78 by Enrique Iglesia.*

(Continued)

*Primary Examiner* — Cephia D Toomer
*Assistant Examiner* — Pamela H Weiss
(74) *Attorney, Agent, or Firm* — Frank Rosenberg; Derek Maughan (57) ABSTRACT

Novel methods of Fischer-Tropsch synthesis are described. It has been discovered that conducting the Fischer-Tropsch synthesis over a catalyst with a catalytically active surface layer of 35 microns or less results in a liquid hydrocarbon product with a high ratio of $C_5$-$C_{20}$:$C_{20+}$. Descriptions of novel Fischer-Tropsch catalysts and reactors are also provided. Novel hydrocarbon compositions with a high ratio of $C_5$-$C_{20}$:$C_{20+}$ are also described.

19 Claims, 10 Drawing Sheets

U.S. PATENT DOCUMENTS

| | | | |
|---|---|---|---|
| 6,680,044 | B1 | 1/2004 | Tonkovich et al. |
| 6,750,258 | B2 | 6/2004 | Wang et al. |
| 6,890,493 | B1 | 5/2005 | Bergh et al. |
| 7,045,486 | B2 | 5/2006 | Wang et al. |
| 2002/0182735 | A1* | 12/2002 | Kibby et al. .................. 436/37 |
| 2003/0012711 | A1* | 1/2003 | Harkins et al. ................ 422/190 |
| 2004/0258587 | A1 | 12/2004 | Bowe et al. |

OTHER PUBLICATIONS

Everson et al., "Fischer-Tropsch Reaction Studies with Supported Ruthenium Catalysts I. Product Distributions at Moderate Pressures and Catalyst Deactiviation," J. Catal. 53, 186-197 (1978).

Khodakov et al., "Pore Size Effect in Fischer-Tropsch Synthesis over Coblat-Supported Mesoporous Silicas," J. Catal. 206, 230-241 (2002).

Girardon et al., "Effect of coalt precursor and pretreatment conditions on the structure and catalytic performance of cobalt silica-suported Fischer-Tropsch catalysts," J. Catal. 230 (2005) 339-352.

Iglesia et al., "Fischer-Tropsch Synthesis on Cabalt Catalysts: Structural Requirements and Reaction Pathways," Studies in Surface Science and Catalysis, vol. 107, in Natural Gas Conversion IV (1997).

Almeida et al., "Fischer-Tropsch Catalyst Deposition on Metallic Structured Supports," pp. 79-84, in Natural Gas Conversion VIII (2007).

* cited by examiner

TAILORED FISCHER-TROPSCH SYNTHESIS PRODUCT DISTRIBUTION

RELATED APPLICATIONS

This is a divisional of U.S. patent application Ser. No. 10/911,976, now abandoned, filed Aug. 4, 2004 which claimed priority to U.S. Provisional Application No. 60/493,094, filed Aug. 5, 2003.

This invention was made with Government support under Contract DE-AC0676RLO1830 awarded by the U.S. Department of Energy. The Government has certain rights in the invention.

FIELD OF THE INVENTION

This invention relates to Fischer-Tropsch synthesis and especially Fischer-Tropsch synthesis of liquid hydrocarbons.

INTRODUCTION

In Fischer-Tropsch synthesis, liquid hydrocarbon fuels are produced from lighter gases. This process was first put to large-scale industrial use by Germany during World War II. Since that time, many chemists and chemical engineers worked to develop improvements to the process. There continues to be intense academic and commercial interest in improving Fischer-Tropsch synthesis because it offers a source of liquid hydrocarbon fuels in addition to the increasingly costly process of extracting oil from the ground. Furthermore, Fischer-Tropsch synthesis could make a significant beneficial environmental impact by capturing methane and other greenhouse gases that might otherwise be released from remote oil wells.

A problem with Fischer-Tropsch synthesis is that it is difficult to control the products resulting from the synthesis. In a series of patents assigned to Exxon, Fischer-Tropsch catalysts were described in which the active catalyst was dispersed around the rim of a catalyst particle. For example, in U.S. Pat. No. 5,128,377 the inventors suggested a surface film of cobalt having a thickness generally ranging from about 0.02 mm to about 0.20 mm, preferably from about 0.04 mm to about 0.20 mm, disposed on particles ranging in diameter from about 0.5 mm to about 2 mm. Similarly, in U.S. Pat. No. 5,140,050 the inventors suggested that the catalytically active cobalt be dispersed in a catalytically active surface layer ranging in average thickness from about 20 microns to 250 microns, preferably from about 40 microns to about 150 microns. Gimpel et al. in WO 02/07872 suggested a preferred range of 5 to 80 microns for the outer layer of catalytically active metal. In each of these cases, the catalyst particles are used in fixed bed or slurry-type reactors. Iglesia et al. in "Reaction-Transport Selectivity Models and the Designer of Fischer-Tropsch Catalysts," modeled Fischer-Tropsch synthesis over rim-type catalysts and provided an equation to calculate the optimal thickness of the catalytically active layer to obtain the minimum methane selectivity.

A few workers have described systems for Fischer-Tropsch synthesis that do not require fixed bed or slurry-type reactions. For example, Schanke et al. in U.S. Pat. No. 6,211,255 described Fischer-Tropsch synthesis through washcoated microchannels of a honeycomb reactor. The inventors did not describe the thickness of the washcoat, nor the distribution of liquid hydrocarbon components in the product. Based on the modeling of Iglesia et al, it would be expected that, in the structure of Iglesia et al., the optimal methane selectivity would require a relatively thick catalyst washcoat.

Wang et al., in U.S. Pat. No. 6,558,634, stated that in order to mitigate the mass transfer limitations of the catalyst structure, the catalyst impregnation preferably forms a porous interfacial layer having a depth less than 50 μm, preferably less than 20 μm, and commented that the thinner impregnated catalyst structure also enhances heat transfer due to a shorter heat transfer pathway, and leads to lower selectivity to methane. Reactors are described in which a porous, contiguous catalyst is placed in a microchannel.

SUMMARY OF THE INVENTION

The inventors have surprisingly discovered a method of Fischer-Tropsch synthesis that results in a superior product mixture of liquid hydrocarbons which, compared to prior art processes, has a relatively high ratio of $C_5$-$C_{20}$:$C_{20+}$. In this method, the reactants are contacted over a Fischer-Tropsch catalyst that has a catalytically active surface layer having a thickness of 35 microns (μm) or less. Preferably, in this method, the catalyst is disposed in a microchannel (or microchannels) that has a bulk flow path extending over the entire length of the microchannel.

The invention includes methods of Fischer-Tropsch synthesis, Fischer-Tropsch catalysts, and reactors containing the catalyst. The invention also provides novel hydrocarbon compositions.

In a first aspect, the invention provides a method of decoupling methanation from synthesis of liquid hydrocarbons in a Fischer-Tropsch process, comprising: contacting $H_2$ and CO in a reaction microchannel over a catalyst at a temperature sufficient to convert the CO to hydrocarbons; wherein there is a bulk flow path past the catalyst and the catalyst has a thickness of catalytically active component that is less than 35 μm; wherein the catalytically active component comprises a Fischer-Tropsch catalytic metal; and wherein the method has the characteristic that, while maintaining other reaction conditions, adjusting reaction temperature can increase CO conversion (absolute) from 25% to 60% while methane selectivity increases by less than 80% (relative) over the same temperature range and conditions.

In another aspect, the invention provides a reactor for Fischer-Tropsch synthesis, comprising a microchannel and a catalytically active surface layer disposed over at least a portion of the surface of the microchannel. The catalytically active surface layer comprises a Fischer-Tropsch catalytic metal and wherein the thickness of the catalytically active surface layer is less than 35 μm. Preferably, there is a bulk flow path through the microchannel. In some preferred embodiments, the thickness of the catalytically active surface layer is less than 20 μm, and in some embodiments in the range of 2 to 20 μm. In some embodiments, the microchannel is in a honeycomb.

The reactor (and/or the inventive methods) can also be characterized by reactivity described in the examples. For example, having methane decoupling selectivity such that when hydrogen and carbon dioxide are fed into the reactor at a $H_2$:CO ratio of 2 and a weight hourly space velocity of 3.73 g CO/g catalyst/hr, a combined ($H_2$+CO) feed pressure of 40 atm, and temperature is increased from 224° C. to 260° C., the CO conversion more than doubles while the methane selectivity increases by 70% or less.

In a further aspect, the invention provides a method of making a hydrocarbon composition via the Fischer-Tropsch synthesis, comprising: contacting $H_2$ and CO over the catalytically active surface of the reactor of the second aspect, at a temperature sufficient to convert the CO to hydrocarbons. Preferably, there is a contiguous bulk flow path through the microchannel having an open dimension of at least 0.1 mm. Also, preferably, at least a portion of the heat generated by the Fischer-Tropsch synthesis is transferred to an adjacent microchannel that contains a heat exchange fluid.

In another aspect, the invention provides a hydrocarbon composition, comprising: C5 to C20 hydrocarbons wherein the amounts (by weight) of hydrocarbons decrease in the order C5>C6>C7>C8>C9>C10>C11>C12>C13>C14>C15>C16>C17>C18>C19>C20. In this composition, C5, C6, C7, and C8 are each present in at least 5 wt %; and C20 is present in the range of 0.3 to 2.0 wt %. In some embodiments, C9 is present in at least 5 wt %; and C20 is present in the range of 0.4 to 1.5 wt %. In some embodiments, C5, C6, and C7 are each present in a range of 6 to 10%. In one embodiment, the hydrocarbon composition has the composition substantially as shown in the figures. In some embodiments, each C5-C20 component is present within ±1% (or within ±0.5%) of the value shown in the figures. For example, from FIG. 5, C9 is 4.9 to 6.9 wt %.

As described herein, the hydrocarbon composition can be obtained from a Fischer-Tropsch reaction without additional refining steps. The invention also includes a method of formulating a fuel comprising combining the hydrocarbon composition with a hydrocarbon or a diesel fuel additive. The hydrocarbon composition may comprise a trace amount (0.1 ppb to 10 ppm) of at least one element selected from the group consisting of Co, Ni, Ru, and Re.

Glossary

The term "liquid hydrocarbons" refers to hydrocarbons that are liquid at room temperature.

"C5 to C20 hydrocarbons" refers to hydrocarbons having from 5 to 20 carbon atoms.

An "inert support" is a support that does not, by itself, react in a Fischer-Tropsch synthesis, although it may interact with the catalytically active layer, and the shape and configuration of the inert support may play an important role in controlling the reaction. Examples of inert support materials include alumina and zirconia.

The thickness of a catalytically active layer is the thickness in which at least 95 wt % of the Fischer-Tropsch catalyst metal (or metals) resides.

A "microchannel" is a channel having at least one dimension of 2 mm, preferably 1 mm, or less. If length is taken to be the direction of flow through the channel, the micro dimension is either height and/or width of the channel.

BRIEF DESCRIPTION OF THE DRAWINGS

FIG. 3 shows α-Olefin to n-paraffin ratio:
(a) Comparison between microstructured catalyst and powder. Catalyst composition: Co/Re/Al$_2$O$_3$ (30% Co, 4.5% Re). (◇) microstructured catalyst A with 15 μm coating; (♦) powder catalyst A with particle size of 150 μm. (20 atm, 240° C., H$_2$/CO=2:1, CO conversion: 49%).
(b) Coating thickness effect in microstructured catalysts. (□) microstructured catalyst A with 15 μm coating; (■) microstructured catalyst B with 40 μm coating; (40 atm, 240° C., H$_2$/CO=2:1, CO conversion: 69%)

FIG. 6 illustrates the effects of catalyst structural properties on hydrocarbon synthesis selectivity: (a) C$_5$+ selectivity; (b) CH$_4$ selectivity. χ values from equation $\chi=R_0^2\Phi\theta_{Co}/r_p$ with $r_p$ and $R_0$ in m and $\theta_{Co}$ in surface Co atoms/m$^2$. (■) Olefin readsorption-CO hydrogenation models by Iglesia et al [5] [8]; (c) Exxon's data; (♦,■,●) This study: Co/Re/Al$_2$O$_3$ catalysts, H$_2$/CO=2:1, 47-70% CO conversion. (♦) 40 atm, 240° C.; (■) 20 atm, 240° C.; (●) 20 atm, 250° C.

DETAILED DESCRIPTION OF THE INVENTION

Catalysts of the present invention include a metal that is catalytically active in the Fischer-Tropsch synthesis. Conventional Fischer-Tropsch catalyst metals are iron (Fe), cobalt (Co), nickel (Ni), ruthenium (Ru), rhenium (Re), and osmium (Os), and may, of course, include combinations of these. Promoters may be present and promoters can be selected from transition metals and metal oxides (except Au and Hg), lanthanide metals or metal oxides, and group IA elements (except H).

Examples of metal oxides include alumina, silica, zirconia, titania, magnesium oxide, vanadium oxide, chromium oxide, manganese oxide, iron oxide, nickel oxide, cobalt oxide, copper oxide, zinc oxide, molybdenum oxide, tin oxide, calcium oxide, aluminum oxide, lanthanum series oxide(s), zeolite(s), and combinations thereof.

Preferably, the catalyst includes a catalytically active layer disposed on a support. Materials that make up the support do not independently catalyze the reaction and may include ceramics and/or metals. In some embodiments, the supports have large pores. Examples of large pore supports include foams, felts and honeycombs. Honeycombs having cross-flow heat exchange channels are known and these may also be used in the invention.

The catalytically active layer preferably contains at least 20%, more preferably at least 50% of a metal oxide. A particularly preferred catalytically active layer contains Co and Re.

A catalyst with a large pore support (also called a "porous catalyst material") has a pore volume of 5 to 98%, more preferably 30 to 95% of the total porous material's volume. Preferably, at least 20% (more preferably at least 50%) of the material's pore volume is composed of pores in the size (diameter) range of 0.1 to 300 microns, more preferably 0.3 to 200 microns, and still more preferably 1 to 100 microns. Pore volume and pore size distribution are measured by mercury porisimetry (assuming cylindrical geometry of the pores) and nitrogen adsorption. As is known, mercury porisimetry and nitrogen adsorption are complementary techniques with mercury porisimetry being more accurate for measuring large pore sizes (larger than 30 nm) and nitrogen adsorption more accurate for small pores (less than 50 nm). Pore sizes in the range of about 0.1 to 300 microns enable molecules to diffuse molecularly through the materials under most gas phase catalysis conditions.

The reaction is conducted in a microreactor that contains at least one microchannel in which a catalyst is disposed. The catalyst does not occupy the entire cross-section of a reaction microchannel so that there is a bulk flow channel adjacent the catalyst (this configuration is known as flow-by). In some embodiments, the catalyst is a piece (or pieces) that can be inserted and removed from a channel, such as a foam or felt. Preferably, the catalyst is a piece that has at least one external dimension (typically length) of at least 1 mm, more preferably at least 5 mm. In preferred embodiments, the catalytically active layer is a wall coating that is less than 35 μm, more preferably less than 20 μm thick. The bulk flow channel has a smallest dimension of at least 0.1 μm, more preferably at least 0.2 μm, still more preferably at least 0.3 μm, and in some preferred embodiments a smallest dimension that is greater than the thickness of the catalytically active layer. Preferably, the bulk flow channel has a length that equals the length of the microchannel. A bulk flow path can be adjacent to a catalyst or through a catalyst inscert (such as a micro honeycomb such as that shown in FIG. 1).

A catalytically active wall coating can be applied by techniques such as washcoating and vapor deposition. A templating composition can be used in forming a catalytically active wall coating; removal of the template can leave a porous material having relatively large pores left by the template.

Conditions for conducting the Fischer-Tropsch reaction include any of the conditions known in the art. In some particularly preferred embodiments, the reaction is conducted in a microchannel reactor to take advantage of the high heat flux. In some preferred embodiments, the reaction is conducted at a temperature of at least 210° C., more preferably at least 225° C., and in some embodiments in the range of 220° C. to 290° C., more preferably 220° C. to 260° C. Pressures in the reactor are preferably 10 atm to 60 atm, more preferably 15 atm to 40 atm.

The ratio of $H_2$:CO is preferably in the range 1 to 3, more preferably 1.75 to 2.5.

The flow rate of CO through the reactor is preferably set to obtain a contact time of 0.1 sec (based on active catalyst packing volume (excluding substrate volume)), more preferably 0.3 sec, and in some embodiments in the range of 0.1 to 1 sec.

The output of the Fischer-Tropsch reaction preferably has a narrow distribution of hydrocarbons; preferably the product contains very little wax.

EXAMPLES

Catalyst Preparation and Characterization

Figure 1:
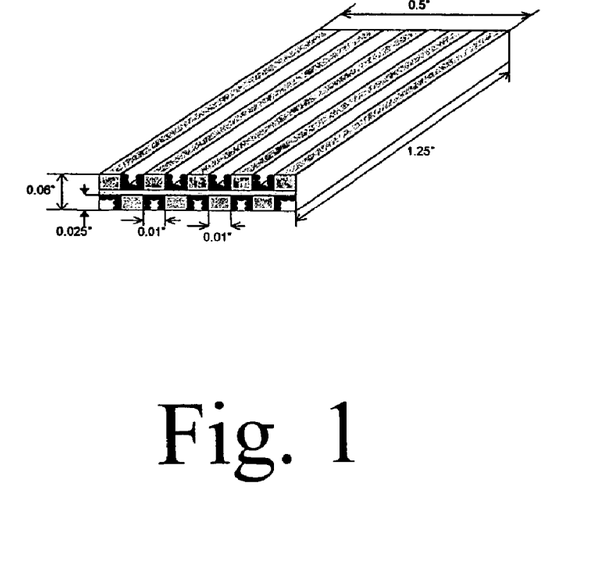
FIG. 1 illustrates a view of a monolith catalyst used in the examples.

FIG. 1 is a schematic drawing illustrating the geometry of a monolith catalyst used in the examples. The general dimension of each monolith was 0.5"×0.06"×1.25". The catalyst substrate 102 was made of aluminum for its high thermal conductivity. The substrate was mini-structured with double-side alternative valleys and peaks. There are 50 valleys for being coated with catalyst ingredients. The width of each valley was 0.01". Valley depth: 0.025", Peak width: 0.01".

To prepare highly porous catalyst layers on the substrate, a sequential washcoating-impregnation process was applied. The surface of aluminum substrate was first oxidized in air at 550° C. to enhance the adhesion to catalyst layers. A solution with optimized rheological properties was used to achieve uniform coats with desired porosities. PQ $Al_2O_3$ (Nyacol) was mixed with poly block copolymer, Pluronic F-127 (HO$(CH_2CH_2O)_{106}(CH_2CH(CH_3)O)_{70}(CH_2CH_2O)_{106}$H) and ethyl alcohol (Aldrich) at 1:(0.9-1):(3.5-5) weight ratios. Dip coating was applied to the substrate with the above-prepared PQ $Al_2O_3$—F127 solution. Excessive solution was removed accordingly. The coat was dried at room temperature subsequently at 100° C. for 20 minutes. Then this dipping-drying process was repeated to achieve the target catalyst loading. Finally, the monolith was calcined at 450° C. for 4 hours to remove F127. Quality control was performed in each step by BET surface area and pore size distribution measurements. In the next stage, active components of Co—Re were co-impregnated into the alumina layer using dip-drying method. During the impregnation the solvent is infiltrated evenly through the microchannels of the substrate, and the excess solution was removed with quantitative records. The thickness of catalyst coating and Co—Re loading on the substrate can be controlled. For the two catalysts shown in Table 1, the monolith had a catalyst coating thickness of 15 μm, a surface area of 140 $m^2/g$ of active coating layer, an average pore size of 95 Å, and a 29 or 32 wt % Co (relative to active coating layer) with an atomic Co/Re ratio of 21. The thickness of catalyst layers can be tailored to be effective to FT product selectivity. The pore size was not significantly reduced during impregnation, and the engineered piece has sufficient surface area for its catalytic function.

Powdered 30 wt %Co/4.5 wt % Re/γ-$Al_2O_3$ catalysts with different particle sizes (45 μm and 150 μm) were prepared using a multi-step incipient-wetness impregnation method with an inter-calcination protocol. Acidic γ-$Al_2O_3$ (Sasol) was pre-treated at 500° C. in air for 2 hours prior to the impregnation. An aqueous solution of cobalt nitrate hexahydrate ($Co(NO_3)2.6 H_2O$) (98% purity, Aldrich) and Perrhenic acid ($HReO_4$) (Engelhard, 53.29 wt % P.M.,) was introduced onto the γ-$Al_2O_3$ support in a crucible dish uniformly. The impregnation volume is based on calculated pore volume of the alumina support. The sample was shaken well for 15 min before being dried in air at 90° C. for 8 hrs. The sample was then calcined at 350° C. in air for 3 hours. Five sequential impregnations were followed with adjusted pore volume. The formulated catalyst has a surface area of 60 $m^2/g$, an average pore size of 100 Å, and pore volume of 0.14 $cm^3/g$.

For the two catalysts shown in Table 1, the monolith had a catalyst coating thickness of about 15 microns, a surface area of 140 $m^2/g$ of active coating layer, an average pore size of 95 Å, and a 29 or 32 wt % Co (relative to active coating layer) with an atomic Co/Re of 21. The thickness of catalyst layers can be tailored to effect FT product selectivity. The pore size was not significantly reduced during impregnation, and the engineered piece has sufficient surface area for its catalytic function.

TABLE 1

|  | Sample ID | |
| --- | --- | --- |
|  | 58233-37-3 | 58233-37-4 |
| $Al_2O_3$ weight, g | 0.016 | 0.0146 |
| Thickness of $Al_2O_3$ layer, μm | 17 | 15 |
| $Al_2O_3$ pore size before Co/Re impreg, Å | 110 | 110 |
| $Al_2O_3$ pore size after Co/Re impreg, Å | 95 | 95 |
| $Al_2O_3$ pore volume before Co/Re impreg, cc/g | 0.64 | 0.64 |
| Co-Re/$Al_2O_3$ pore volume after Co/Re impreg, cc/g | 0.37 | 0.37 |
| $Al_2O_3$ BET before Co/Re impre, $m^2/g$ | 208 | 208 |
| Co-Re/$Al_2O_3$ BET after Co/Re impre, $m^2/g$ | 139 | 139 |
| measured Co/Co-Re-$Al_2O_3$, wt % | 29 | 32 |

Reactor and Catalyst Testing

Figure 2:
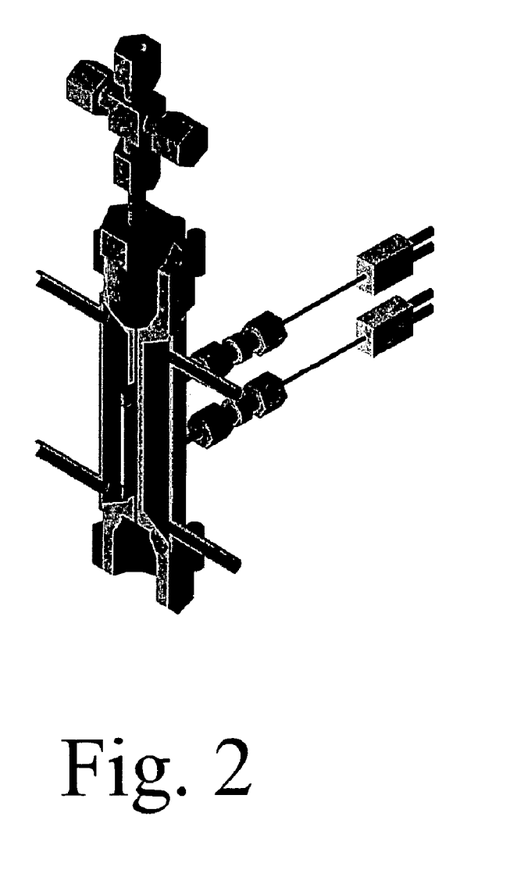
FIG. 2 shows a microchannel test reactor.

Experiments were carried out in a start-of-the-art microchannel reactor system (FIG. 2) to maintain isothermal conditions, allowing the catalyst to operate at higher average temperatures for highly exothermic FT synthesis reactions. The microchannel is "sandwiched" by two separated oil heat transfer channels, which are designed to allow a large oil circulation rate while maintaining a high heat transfer coefficient. Two pieces of the catalyst monoliths described above were snugly inserted in the microreactor providing the total length of the catalyst bed of 2.5 inches. The catalyst monolith is located in the downstream portion of the channel so that the reactants can be preheated to a desired temperature in the upstream portion of the channel before entering the catalyst bed. The channel gap of the reactor is 0.06 inch wide and the channel width is 0.5 inches. In another words, the individual channel of the microreactor has the dimension of: 0.5" (x-direction) x0.06" (y-dir) x3" (z-dir). The channel is filled with catalyst inserts snugly. There is essentially no gap between the catalyst pieces and the reactor walls. The coated catalyst substrate is touching the inner wall of the microreactor channel. Four thermocouples along the catalyst bed have indicated that the temperature gradient within the catalyst bed is less than 1° C. under the targeted reaction conditions. After catalyst was activated in hydrogen at about 400° C. overnight, a syngas feed with $H_2/CO$ ratio of 2 was introduced and FT synthesis was conducted at pressures from 1000 to 4000 kPa.

Pretreatment gases and reactant feed mixture can be precisely delivered to the catalyst bed using gas manifolds. Reactions take place in the catalyst bed with uniform reactor wall temperature. Reactor effluent is quenched by being directed through a dip tube, being fed into and condensed in a chilled vessel that is immersed in a circulating coolant. Noncondensed gases are depressurized down through a backpressure regulator, and analyzed using an on-line gas chromatography to determine CO conversion and light product selectivity. Condensed liquid and or solid product mixture are periodically taken for off line GC analysis. All process parameters such as temperature, pressure, flowrates are recorded in a computer.

3. Results and Discussion

Reduced diffusion limitations when using a smaller particle size powder catalyst have been observed in the performance evaluation of two different particle size catalysts with the same metal site density. Shown in Table 2, it can be seen that in the same operating conditions, the smaller particle catalyst yields much lower methane selectivity and higher chain growth probability as result of the shorter diffusion distance. Since the Fischer-Tropsch synthesis occurs in a diffusion-controlled regime, improving monomer reactant diffusion rates to the catalyst surface will enhance the overall reaction rate. Moreover, the catalyst internal pores are usually filled with hydrocarbon liquids during the synthesis reaction. Since $H_2$ diffusivity in the hydrocarbon liquids is much higher than that of CO, a methanation-favored environment can be created due to formation of high $H_2/CO$ ratio reactant mixture within the pellet or powder catalyst. Therefore, a smaller particle size catalyst with shortened diffusion length will enhance CO diffusion rate and result in a relatively low local $H_2/CO$ ratio within the catalyst to minimize the selectivity to methane. In the meantime, the reduced transport resistance within a small catalyst particle also leads to high local reactant concentration on the active sites, which increases the reaction turnover rate for a positive order kinetics[2][6][8][11][22]. This was validated when a higher productivity (metal-time-yield) of $C_2+$ was achieved with small catalyst particles.

TABLE 2

Performance data of powder catalysts with different diffusion lengths
T = 224° C., $H_2/CO$ = 2

| Catalyst Co/Re = 21 (atomic ratio) | Co wt % | P (atm) | GHSV $hr^{-1}$ | WHSV gCO/gcat/hr | CO conversion, % | $CH_4$ selectivity, wt % | α | Productivity, $gC_2$+/gcat/hr | Productivity, $gC_2$+/gCo/hr |
|---|---|---|---|---|---|---|---|---|---|
| Catalyst A: (150 μm powder) | 30 | 10 | 20,016 | 4.9126 | 48.6 | 13.03 | 0.81 | 0.9218 | 3.0726 |
|  |  | 25 |  | 4.9126 | 62.6 | 9.54 | 0.86 | 1.2818 | 4.2728 |
| Catalyst B: (45 μm powder) | 30 | 25 | 22,886 | 4.9126 | 76.8 | 6.11 | 0.88 | 1.6890 | 5.6301 |
|  |  | 35 |  | 4.9126 | 90.2 | 1.94 | 0.92 | 2.1355 | 7.1180 |

Figure 3A:
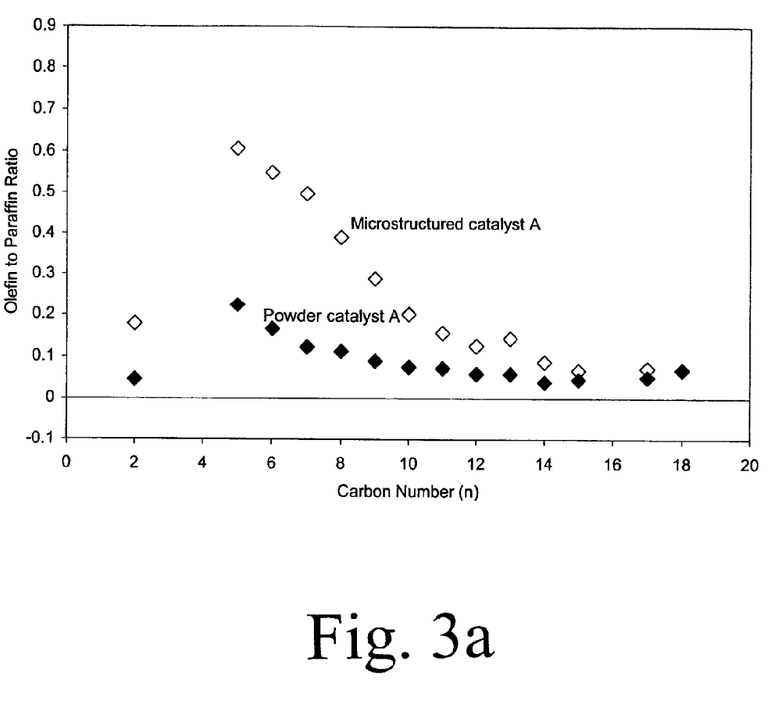

In order to compare the performance of the monolithic catalysts and powder catalysts, the Fischer-Tropsch synthesis reactions using these two catalysts were carried out at the same temperature, pressure as well as the same conversion level. The similar conversion was achieved by adjusting the space velocity based on the active catalyst weight. Results shown in Table 3 indicate that the methane yield was considerably lower in the monolithic catalytic system compared to the powder catalyst in the same temperature, pressure and at the same conversion level. The significantly higher olefin to paraffin ratio for the ministructured catalyst A with 15 μm coating also indicates much lower diffusion resistance than for the powder catalyst (see Table 3 $C_8=/C_8$, and FIG. 3a). On the heat transfer side, the fact that the structured metal based catalyst yields lower methane selectivity at a given temperature suggests that the heat generated during reaction was better conducted away in this engineered catalyst bed and hot spots had been minimized. In a high temperature (240-260° C.) synthesis condition that strongly favors methanation, the monolithic catalyst could successfully suppress the methane yield by the conjugate effects of both improved heat transfer and mass transfer. With conventional reactor configuration, however, it is difficult to maintain low methane selectivities at such high temperatures. The isothermal attribute of the integrated microchannel monolithic catalytic reactor provides the potential of a high space-time yield with deployment of more active catalyst. Synthesis in the monolithic reactor at high temperature leads to high one-pass conversion but without sacrificing low methane selectivity.

TABLE 3

Performance comparison of microstructured catalysts with different diffusion properties and powder catalyst.
$H_2/CO = 2:1$

| Catalyst | Coating thickness or particle size (μm) | Co Wt % | Re wt % | T (°C.) | P (atm) | CO Conversion (wt %) | $CH_4$ Selectivity (wt %) | Chain Growth Probability | $C_8=/C_8$ | Total olefin/paraffin ratio in the liquid product mixture |
|---|---|---|---|---|---|---|---|---|---|---|
| Engineered catalyst A | 15 | 30.9 | 5.1 | 240 | 40 | 69.0 | 5.89 | 0.88 | 0.404 | |
| | | | | 240 | 20 | 48.9 | 7.54 | 0.87 | 0.390 | |
| | | | | 250 | 20 | 74.9 | 8.11 | 0.86 | 0.211 | |
| Engineered catalyst B | 40 | 29.6 | 4.5 | 240 | 40 | 68.0 | 9.26 | 0.87 | 0.135 | |
| | | | | 240 | 20 | 47.9 | 12.86 | 0.83 | 0.102 | |
| | | | | 250 | 20 | 64.6 | 14.23 | 0.81 | 0.096 | |
| Powder catalyst A | 150 | 30.0 | 4.8 | 240 | 40 | 70.0 | 12.40 | 0.86 | 0.134 | |
| | | | | 240 | 20 | 49.8 | 13.77 | 0.82 | 0.128 | |
| | | | | 250 | 20 | 68.5 | 15.83 | 0.80 | 0.112 | |

Figure 4:
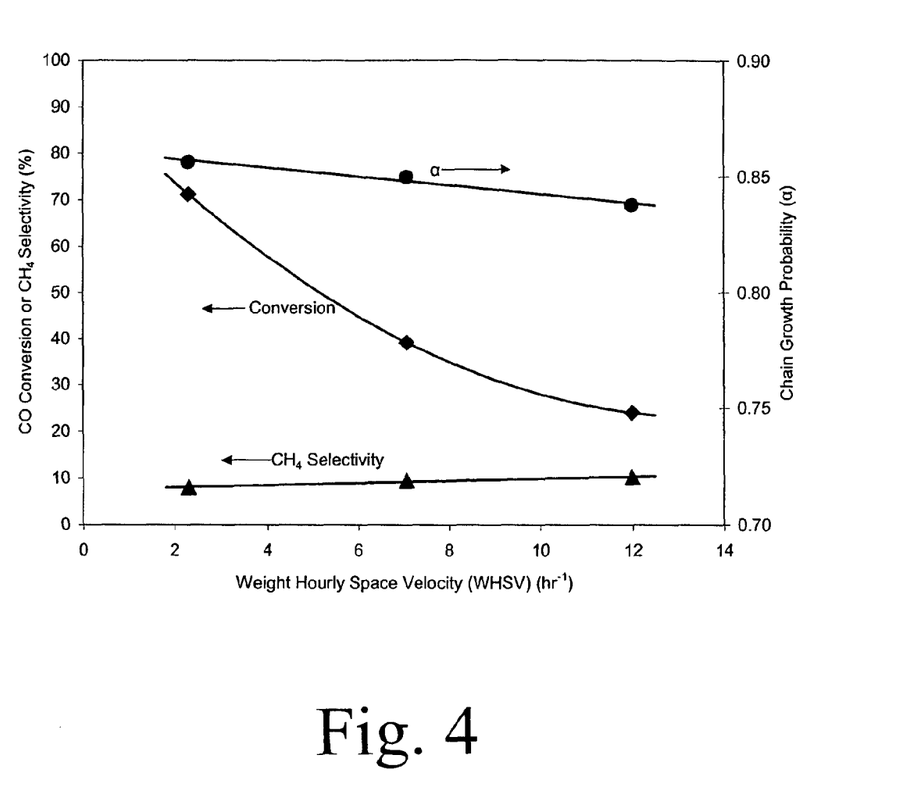
FIG. 4 shows the space velocity effect: (♦) CO conversion; (▲) CH$_4$ selectivity; (●) Chain growth probability (α). Microstructured catalyst A: Co/Re/Al$_2$O$_3$ (30% Co, 4.5% Re with 15 μm coating); (20 atm, 250° C., H$_2$/CO=2:1)

In the above experiments the same conversion level at the same temperature and pressure was maintained by varying the weight hourly velocity. Due to diffusion limitation in the bulk phase, reactant bypass in the monolithic reactor caused some extent of inefficient catalyst utilization. Thus, smaller WHSV was used to achieve similar conversion as in the powder bed. As shown in FIG. 4, the CO conversion decreases with increases of space velocity due to the well known reaction kinetics, but the increase of $CH_4$ selectivity and decrease of the chain growth probability due to the shortened residence time were not significant. The space velocity change in this experiment covers the range of those WHSV variations in the test when the same conversion level was desired at the same temperature and pressure. The selectivity comparison between the monolith catalyst and powder catalyst at the same conversion level is shown in Table 3.

Figure 3B:
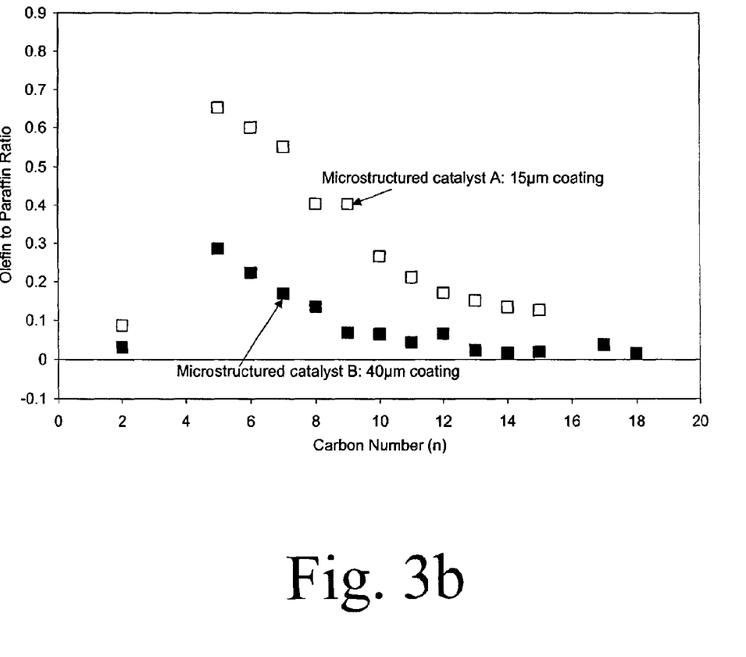

The effect of the coating layer thickness is also shown in Table 3 and FIG. 3b. The catalyst loading on the substrate varies with coating thickness, in this particular example with 15 μm and 40 μm coatings, the total catalyst ($Al_2O_3$+Co+Re) loadings are 0.0527 g and 0.1155 g respectively. It has been found that increasing the coating layer thickness on the microstructured aluminum substrate leads to decrease of the chain growth probability and increase of $CH_4$ selectivity. This is certainly a result of increased diffusion resistance. In such a case, the α-olefins readsorption is promoted due to the longer olefin residence time on the catalyst sites and consequently decreased chain termination to olefins. The direct evidence is that the lower olefin to paraffin ratio is observed in the final liquid wax samples with thicker coating layer catalyst (FIG. 3(b)). On the other hand, the increased diffusion resistance leads to fast CO depletion and enhanced hydrogenation reactions resulting in low chain growth probability. In the meantime, it is observed that productivity to $C_2$+ hydrocarbon, i.e. the metal-time yield, is higher when a thin catalyst coating was applied to the substrate.

Figure 5:
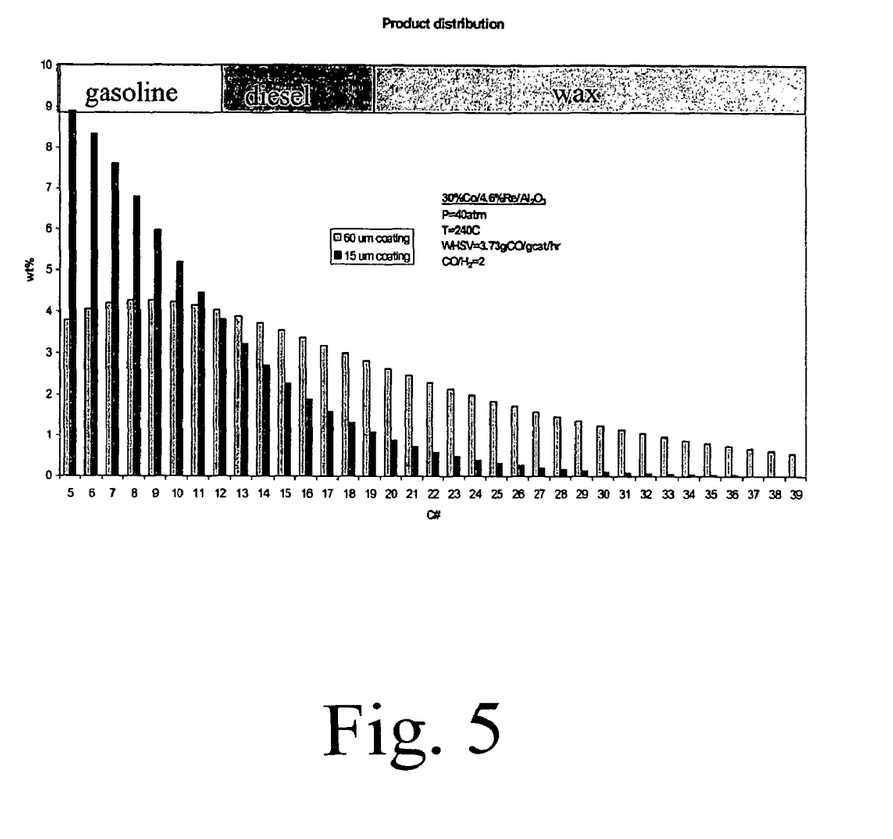
FIG. 5 is a plot of product distribution from Fischer-Tropsch reactions over 15 μm (■) and 60 μm (□) thick catalyst coatings. The catalyst coating was 30 wt % Co, 4.6 wt % Re on alumina. Conditions were: 240° C., 40 atm, H$_2$/CO=2, WHSV=3.73 CO/g cat/hr.

FIG. 5 is another plot that shows the product distribution when using the monolith catalysts with two coating thickness. Under the same weight hourly space velocity, pressure and temperature, the thinner coating (15 μm) catalyst yields unique narrow product distribution while maintaining similar and low methane selectivity (10%). The thicker coated (60 μm) monolith catalyst appears to give similar performances as a fixed bed reactor packed with 70-100 mesh particles with the same catalyst composition. A particular advantage with a narrow range of hydrocarbon liquid product distribution and low methane selectivity is that it can minimize the cost associated with hydrocracker and distillation for gasoline or diesel productions.

Figure 6A:
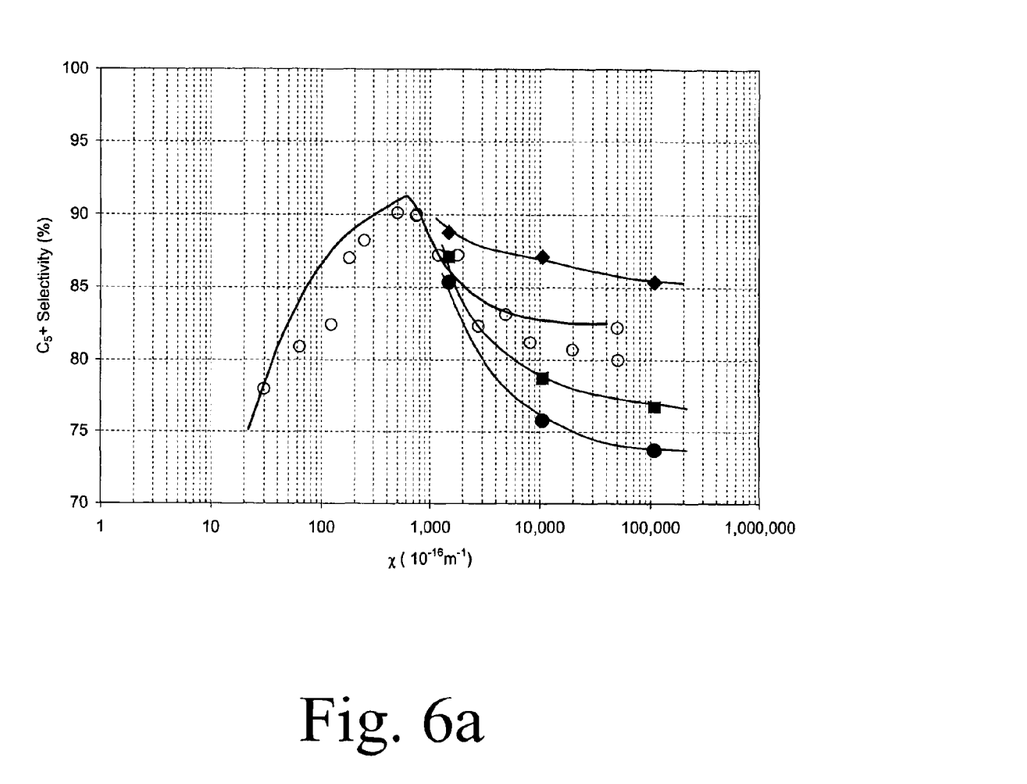
Figure 6B:
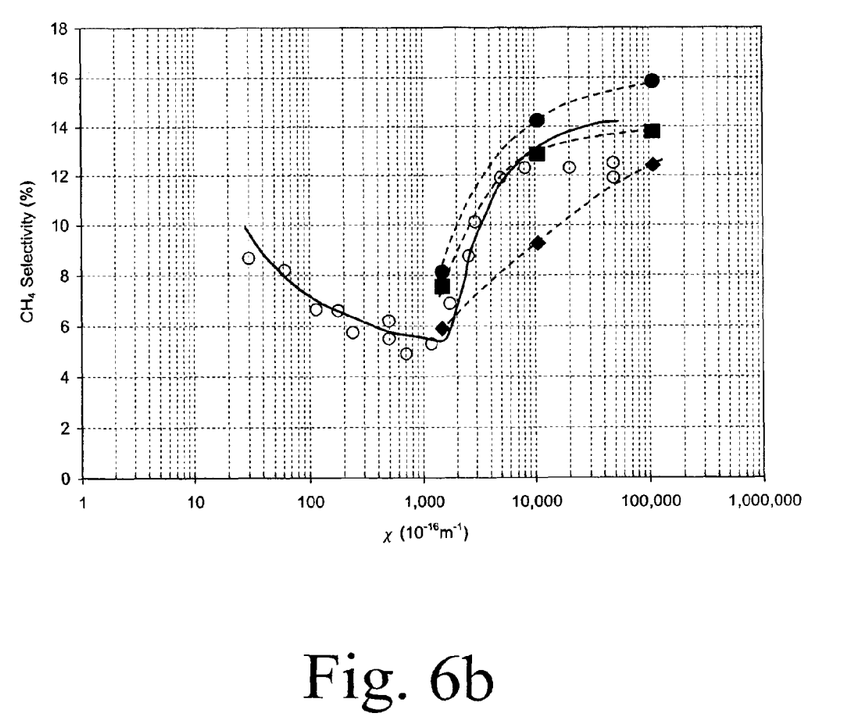

While the present invention is not limited by this theory, some of the results can be explained by a theoretical analysis. As defined by Iglesia et al. [5] [8][11], catalyst structural parameter, $\chi = R_0^2 \Phi \theta_{Co}/r_p$, which contains the diffusion length $R_0$, pore radius $r_p$ of the metal oxide support, porosity $\Phi$, and Co site density $\theta_{Co}$, determines in part the severity of transport limitations. In this analysis, the catalyst structural parameter is varied by changing the diffusion lengths for both micro-structured metallic conductive monolith and the supported powder catalysts. In FIG. 6, $CH_4$ selectivity and $C_5$+ selectivity are plotted as function of this structural parameter $\chi$. $\chi$ for the monolithic catalyst was calculated using the washcoat layer thickness as the diffusion distance, and for the powder catalyst the diffusion length is the average radius of the catalyst particle. The experimental results from this study are plotted against Iglesia's theory and literature reported data in FIG. 6. It can be seen that our data follow the same trend as the Iglesia's model [11]. The $C_5$+ selectivity decreases with increase of $\chi$, and $CH_4$ selectivity increases when $\chi$ increases. These selectivity values are in excellent agreement with the model prediction of the same order of magnitude even with different catalyst compositions and operating conditions. These results also suggest that the Fischer-Tropsch synthesis reaction is carried out in the regime of diffusion-inhibited chain growth. In such cases, the selectivity trends caused by diffusion-enhanced olefin readsorption have been reversed as transport resistances increase. Because a large catalyst structural parameter leads to significant depletion of monomer precursors on the catalyst sites, the intralayer gradients in reactant concentrations become significant when Thiele modulus is large, i.e., the diffusion rate of CO is much smaller than its hydrogenation reaction kinetic rate.

To illustrate such intralayer gradients and optimize the monolith catalyst performance, a pseudo-3D model was used to evaluate the coating thickness effect on the diffusion-reaction system. As we know, parameters such as temperature, channel geometry, flowrate, washcoat $$u(x, y) \frac{\partial c}{\partial z} = D \left( \frac{\partial^2 c}{\partial x^2} + \frac{\partial^2 c}{\partial y^2} \right)$$

properties and catalytic activity play important roles either independently or interactively in reactor behavior. It usually shows large complexity when a full 3D modeling is used. Therefore, a 2D model using dynamic time as the z-axis can be adopted to describe a 3D problem for our monolithic catalyst with regular shape so that the computation time can be greatly shortened. In the model assumptions, temperature is constant because of the highly conductive substrate in addition to the short heat transfer length in the microchannel reactor, and the heat release from the synthesis reaction is mitigated in such a way. The flow in the monolith channel is laminar and the axial diffusion of the reactants is negligible compared to the convection. We also assume identical conditions for each channel of the whole monolith whose behavior can be represented by one channel, and the catalyst sites are uniformly located in the washed coatings. The partial differential equations describing the mass balance in a monolith channel are written in two domains. In the flowing channel of the monolith, the reactant (CO) is transported by diffusion (in x, y directions) and convection (z-direction but represented by t that is solved as time dependent 2D problem.

In the washcoated catalyst porous phase, synthesis reactions occur and the material balance is characterized by kinetic rate and effective diffusion that reflects the pore properties. A Langmuir-Hinshelwood kinetics rate for the Co catalyst [11] was used in which parameters were regressed to fit small powder catalyst testing data in the microchannel reactors that provide isothermal solutions to the exothermic system.

$$(-r_{CO}) = D_{eff}\left(\frac{\partial^2 c}{\partial x^2} + \frac{\partial^2 c}{\partial y^2}\right)$$

The simulation results show the concentration distribution of the monomer precursor (CO) in a monolith channel. The CO concentration with a 60 μm catalyst coating yields larger gradient within the layer than the thinner coating with 15 μm thickness. It suggests that the efficiency of catalyst utilization is higher when having a thinner coating due to reduced mass transfer resistance.

Temperature Effect

Figure 7:
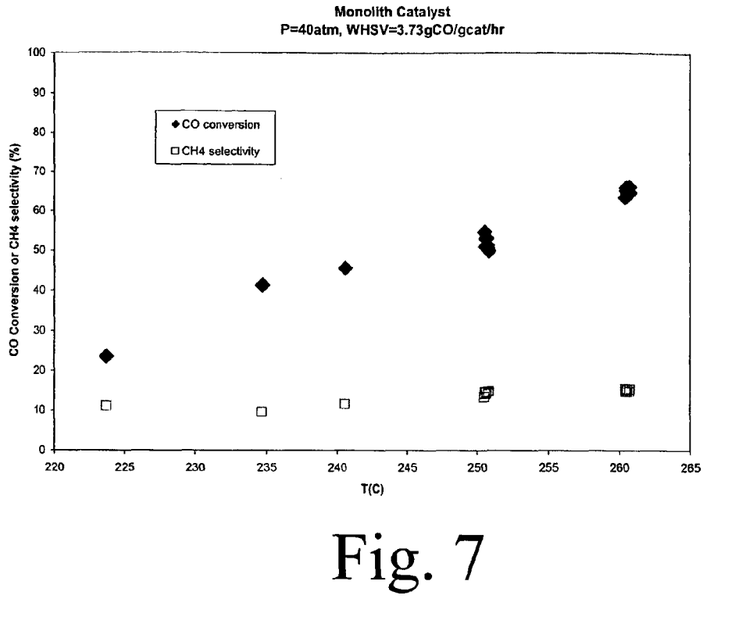
FIG. 7 shows CO conversion (♦) and methane selectivity (□) plotted as a function of temperature. Conditions were: 40 atm, H$_2$/CO=2, WHSV=3.73 CO/g cat/hr.

CO conversion increased from 25% to 64% when the temperature was raised from 224° C. to 260° C. at 40 atm at a weight hourly space velocity of 3.73 g CO/g cat/hr, over a monolith catalyst with a 15 μm catalyst coating, with a $H_2$/CO of 2. See FIG. 7. The methane selectivity remained about 10%, which is a unique feature that is different from conventional FT reaction technology in which methane selectivity increases as temperature is increased. Pressure was measured at both upstream and downstream of the catalyst bed, since the monolith catalyst causes only slight pressure drop across the bed, the whole system pressure is 40 atm. According to the present invention, pressure should be measured upstream of the catalyst, if possible. The catalyst loading on the substrate varies with coating thickness, in this particular example with 15 μm coating, the total catalyst loading is 0.047 g. When we calculate weight hourly space velocity, substrate weight was not included, but alumina ($Al_2O_3$) coating as metal support is included as part of catalyst weight. That is: catalyst weight=$Al_2O_3$ coating+Co loading+Re loading).

Pressure Effect

Figure 8:
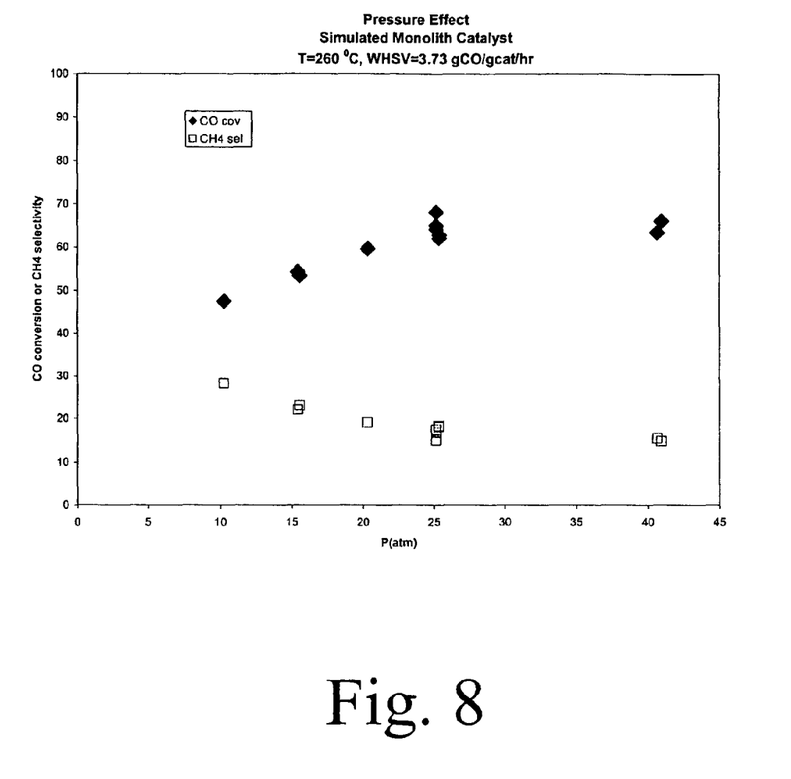
FIG. 8 shows CO conversion (♦) and methane selectivity (□) plotted as a function of pressure. Conditions were: 260° C., H$_2$/CO=2, WHSV=3.73 CO/g cat/hr.

Total pressure effect is shown in FIG. 8, at a certain temperature and space velocity, high pressure suppresses methane formation and increases syngas conversion. This occurs because high partial pressure of CO and hydrogen increases the overall kinetic rate. In the meantime, the increased driving force of diffusion when the CO in the bulk phase is increased will mitigate the depletion of monomer on the catalyst sites, so that the chain growth probability is enhanced resulting in low methane selectivity.

As shown in FIG. 8, when tested at a 260° C. and a weight hourly space velocity (WHSV) of 3.73 g CO/g cat/hr, it was found that high pressure suppresses methane formation and increases syngas conversion.

[1] F. Fischer, H. Tropsch, Brennstoff-Chem., 7 (1926) 299.
[2] G. P. Van Der Lann and A. A. C. M. Beenackers, Catal. Rev.-Sci. Eng., 41(3&4) (1999) 255.
[3] B. H. Davis, Catal. Today, 71 (2002) 249.
[4] M. E. Dry, Catal. Today, 71 (2002) 227.
[5] E. Iglesia, Stud. Surf. Sci. Catal. 107 (1997) 153.
[6] M. E. Dry, Appl. Catal. A: Gen., 138 (1996) 319.
[7] D. J. Duvenhage, T. Shingles, Catal. Today, 71 (2002) 301.
[8] E. Iglesia, Appl. Catal. A 161 (1997) 59.
[9] E. Iglesia, S. L. Soled, R. A. Fiato, G. H. Via, Stud. Surf. Sci. Catal. 81, (1994) 433.
[10] E. Iglesia, S. C. Reyes, R. J. Madon, S. L. Soled, Adv. Catal. 39 (1993)
[11] E. Iglesia, S. C. Reyes, S. L. Soled, in: E. R. Becker, C. J. Pereira (Eds.), Computer-Aided Design of Catalysts, Dekker, N.Y., 1993, p. 199.
[12] E. Iglesia, S. L. Soled, R. A. Fiato, J. Catal. 137 (1992) 212.
[13] D. Schanke, E. Bergene, A. Holmen, U.S. Pat. No. 6,211,255, 2001.
[14] K. B. Arcuri, K. L. Agee, M. A. Agee, U.S. Pat. No. 6,262,131, 2001.
[15] A.-M. Hilmen, E. Bergene, O. A. Lindvag, D. Schanke, S. Eri, A. Holmen, Catal. Today, 69 (2001) 227.
[16] A.-M. Hilmen, E. Bergene, O. A. Lindvag, D. Schanke, S. Eri, A. Holmen, Stud. Surf. Sci. Catal., 130 (2000) 1163.
[17] V. D. Mesheryakov, V. A. Kirillov, N. A. Kuzin, Chem. Eng. Sci. 54 (1999) 1565.
[18] Y. Wang, D. P. Vanderwiel, A. L. Y. Tonkovich, Y. Gao, E. G. Baker, U.S. Pat. No. 6,660,237, 2003.
[19] Y. Wang, D. P. Vanderwiel, A. L. Y. Tonkovich, Y. Gao, E. G. Baker, U.S. Pat. No. 6,558,634, 2003.
[20] Y. Wang, D. P. Vanderwiel, A. L. Y. Tonkovich, Y. Gao, E. G. Baker, U.S. Pat. No. 6,491,880, 2002.
[21] Y. Wang, D. P. Vanderwiel, A. L. Y. Tonkovich, Y. Gao, E. G. Baker, U.S. Pat. No. 6,451,864, 2002.
[22] I. C. Yates, C. N. Satterfield, Energy & Fuels, 5 (1991) 168.

We claim:

1. A hydrocarbon composition made by a Fischer-Tropsch synthesis, comprising: C5 to C20 hydrocarbons wherein the amounts (by weight) of hydrocarbons decrease in the order C5>C6>C7>C8>C9>C10>C11>C12>C13>C14>C15> C16>C17>C18>C19>C20; wherein C5, C6, C7, and C8 are each present in at least 5 wt %; and wherein C20 is present in the range of 0.3 to 2.0 wt %; and further wherein the weight percents of C5 to C20 hydrocarbons are 8.5-9.5, 8.0-9.0, 7.0-8.0, 6.3-7.3, 5.4-6.4, 4.7-5.7, 3.9-4.9, 3.3-4.3, 2.7-3.7, 2.2-3.2, 1.7-2.7, 1.3-2.3, 1.0-2.0 0.7-1.7, 0.5-1.5, and 0.3-1.3 weight percent respectively.

2. The hydrocarbon composition of claim 1 wherein C9 is present in at least 5 wt %; and C20 is present in the range of 0.4 to 1.5 wt %.

3. The hydrocarbon composition of claim 1 wherein C5, C6, and C7 are each present in a range of 6 to 10%.

4. The hydrocarbon composition of claim 1 wherein the weight percents of C5 to C20 hydrocarbons are about 9, 8.5, 7.5, 6.8, 5.9, 5.2, 4.4, 3.8, 3.2, 2.7, 2.2, 1.8, 1.5, 1.2, 1.0, and 0.8 weight percent respectively.

5. A method of making a hydrocarbon composition comprising C5 to C20 hydrocarbons wherein the amounts (by weight) of hydrocarbons decrease in the order C5>C6>C7>C8>C9>C10>C11>C12>C13>C14>C15>C16>C17>C18>C19>C20; wherein C5, C6, C7, and C8 are each present in at least 5 wt %; and wherein C20 is present in the range of 0.3 to 2.0 wt %; comprising reacting CO and $H_2$ in a reactor for Fischer-Tropsch synthesis, comprising: a microchannel; and a catalytically active surface layer disposed over at least a portion of the surface of the microchannel; wherein the catalytically active surface layer comprises a Fischer-Tropsch catalytic metal and wherein the thickness of the catalytically active surface layer is less than 35 μm.

6. The hydrocarbon composition of claim 1 wherein said hydrocarbon composition is obtained from a Fischer-Tropsch reaction without additional refining steps.

7. The hydrocarbon composition of claim 1 further comprising a trace amount (0.1 ppb to 10 ppm) of at least one element selected from the group consisting of Co, Ni, Ru, and Re.

8. The method of claim 5 wherein the thickness of the catalytically active surface layer is less than 20 μm.

9. The method of claim 5 wherein wherein methane selectivity is 10% or less.

10. The method of claim 5 wherein the microchannel comprises a contiguous bulk flow path having an open dimension of at least 0.1 mm.

11. The method of claim 10 further comprising transferring heat from the microchannel to an adjacent microchannel that contains a heat exchange fluid.

12. The hydrocarbon composition of claim 1 wherein the composition is made by a Fischer-Tropsch synthesis having a CO conversion of at least 49%.

13. The hydrocarbon composition of claim 1 wherein the composition is made by a Fischer-Tropsch synthesis having a CO conversion in the range of 49% to 75%.

14. The hydrocarbon composition of claim 1 wherein the composition is made by a Fischer-Tropsch synthesis having a methane selectivity of 10% or less.

15. A hydrocarbon composition, comprising: C5 to C20 hydrocarbons wherein the amounts (by weight) of hydrocarbons decrease in the order C5>C6>C7>C8>C9>C10>C11>C12>C13>C14>C15>C16>C17>C18>C19>C20; wherein C5, C6, C7, and C8 are each present in at least 5 wt %; and wherein C20 is present in the range of 0.3 to 2.0 wt %; and wherein the weight percents of C5 to C20 hydrocarbons are 8.0-10.0, 7.5-9.5, 6.5-8.5, 5.8-7.8, 4.9-6.9, 4.2-6.2, 3.4-5.4, 2.8-4.8, 2.2-4.2, 1.7-3.7, 1.2-3.2, 0.8-2.8, 0.5-2.5 0.2-2.2, 0.4-2.0, and 0.3-1.8 weight percent respectively.

16. The hydrocarbon composition of claim 15, wherein the weight percents of C5 to C20 hydrocarbons are 8.5-9.5, 8.0-9.0, 7.0-8.0, 6.3-7.3, 5.4-6.4, 4.7-5.7, 3.9-4.9, 3.3-4.3, 2.7-3.7, 2.2-3.2, 1.7-2.7, 1.3-2.3, 1.0-2.0 0.7-1.7, 0.5-1.5, and 0.3-1.3 weight percent respectively.

17. The hydrocarbon composition of claim 15 further comprising a trace amount (0.1 ppb to 10 ppm) of at least one element selected from the group consisting of Co, Ni, Ru, and Re.

18. A method of making a hydrocarbon composition, comprising: reacting CO and $H_2$ in a reactor for Fischer-Tropsch synthesis to form the hydrocarbon composition comprising: C5 to C20 hydrocarbons wherein the amounts (by weight) of hydrocarbons decrease in the order C5>C6>C7>C8>C9>C10>C11>C12>C13>C14>C15>C16>C17>C18>C19>C20; wherein C5, C6, C7, and C8 are each present in at least 5 wt %; and wherein C20 is present in the range of 0.3 to 2.0 wt %; and further wherein the weight percents of C5 to C20 hydrocarbons are 8.5-9.5, 8.0-9.0, 7.0-8.0, 6.3-7.3, 5.4-6.4, 4.7-5.7, 3.9-4.9, 3.3-4.3, 2.7-3.7, 2.2-3.2, 1.7-2.7, 1.3-2.3, 1.0-2.0 0.7-1.7, 0.5-1.5, and 0.3-1.3 weight percent respectively.

19. The method of claim 18 wherein methane selectivity is 10% or less.

\* \* \* \* \*